United States Patent
Crawford et al.

(12)

(10) Patent No.: US 6,336,278 B1
(45) Date of Patent: Jan. 8, 2002

(54) METHOD AND SYSTEM FOR CONTROLLING AIRFLOW IN A MULTIPLE BED DESICCANT DRYING SYSTEM

(75) Inventors: Robert R. Crawford; Donald D. Rainville, both of Stafford, VA (US)

(73) Assignee: Universal Dynamics, Inc., Woodbridge, VA (US)

( * ) Notice: Subject to any disclaimer, the term of this patent is extended or adjusted under 35 U.S.C. 154(b) by 0 days.

(21) Appl. No.: 09/554,680
(22) PCT Filed: Nov. 18, 1998
(86) PCT No.: PCT/US98/24779
§ 371 Date: May 18, 2000
§ 102(e) Date: May 18, 2000
(87) PCT Pub. No.: WO99/26034
PCT Pub. Date: May 27, 1999
(51) Int. Cl.[7] .................................................. F26B 21/06
(52) U.S. Cl. ............................................. 34/80; 34/473
(58) Field of Search .......................... 34/332, 416, 472, 34/473, 553, 562, 566, 378, 80, 81, 82; 55/339, 413, 424, 426, 432, 459.1; 95/122, 123, 126; 96/134, 209

(56) References Cited
U.S. PATENT DOCUMENTS

| | | | |
|---|---|---|---|
| 3,800,507 A | * | 4/1974 | Howell et al. ................. 95/122 |
| 4,023,940 A | * | 5/1977 | Shultz .......................... 96/112 |
| 4,601,114 A | | 7/1986 | Noguchi |
| 4,898,599 A | * | 2/1990 | Settlemeyer .................... 95/92 |
| 5,123,277 A | | 6/1992 | Gray et al. |
| 5,485,686 A | * | 1/1996 | Sears, Jr. ..................... 34/473 |
| 5,926,969 A | * | 7/1999 | Crawford et al. ............... 34/80 |

* cited by examiner

*Primary Examiner*—Jiping Lu
(74) *Attorney, Agent, or Firm*—Crowell & Moring LLP

(57) ABSTRACT

A method and system for controlling airflow in a desiccant drying system having two desiccant beds. A first diverter valve (14A) communicates with each of the desiccant beds, a regeneration air inlet (22A), and a process air outlet (28A). A second diverter valve (16A) communicates with each of the desiccant beds, a process air inlet, and a regeneration air outlet. A first of the beds is regenerated by moving the first diverter valve to a position which the first bed communicates with the regeneration air inlet and a second of the beds communicates with the process air outlet, and by moving the second diverter valve to a position in which the first bed communicates with the regeneration air outlet and the second bed communicates with the process air inlet. The first bed is subsequently cooled by moving the first diverter valve to an intermediate cooling position in which the second bed communicates with both of the process air outlet and the first bed, and closing the regeneration air inlet.

13 Claims, 3 Drawing Sheets

METHOD AND SYSTEM FOR CONTROLLING AIRFLOW IN A MULTIPLE BED DESICCANT DRYING SYSTEM

BACKGROUND OF THE INVENTION

This invention relates to a method and a system for controlling airflow in a multiple bed desiccant drying system, particularly in a twin tower desiccant dehumidifier, and particularly during a regeneration phase, and during transition periods between phases.

Multiple desiccant bed systems used for drying a synthetic plastic material are known, in which a moisture-laden gas stream is formed as the exit gas from a hopper in which plastic granules are dried by a stream of drying air. During an adsorption phase, the exit gas is conducted through one or more drying vessels filled with an adsorption medium, whereby the adsorption medium extracts the moisture from the gas so that the resulting dry gas can be used again as a drying gas for drying plastic granules.

When the adsorption medium in a drying vessel is saturated with moisture, the drying vessel is transferred to a regeneration phase in which heated ambient air is conducted through the adsorption medium which takes up and carries away the moisture which was adsorbed therein. The ambient air used to dry the adsorption medium typically contains moisture, which increases the drying time required to regenerate the adsorption medium.

During the regeneration phase, since the adsorption medium is heated by the heated regeneration air, the adsorption medium is typically subsequently cooled with a cooling air flow prior to a transition to the adsorption phase. If moisture-laden ambient air is used as the cooling air, the adsorption medium will adsorb the moisture therefrom, reducing the efficiency (i.e. dryness) of the regeneration process.

By using a multiple bed system, the drying process can be continued essentially without interruption, by utilizing one or a portion of the beds for adsorption, while simultaneously regenerating other of said beds, by appropriately channeling the process air flow.

In commonly owned prior U.S. patent application Ser. No. 08/874,654 to Crawford et al., the disclosure of which is expressly incorporated by reference herein, a system and method of operation is disclosed in which two towers are connected by a 4-valve system. The 4-valve system is controlled such that the process air stream is progressively moved from the saturated bed to the regenerated bed. In that invention the terminal disruption of the dewpoint is minimized by any residual heat that remains in the fresh tower being brought online.

In previously known drying systems, a problematic issue is disruption of the process air temperature and dewpoint quality when changing from the saturated tower to the freshly regenerated tower. Furthermore, in previously known drying systems, bringing a heat exchanger online at the appropriate time without undue complexity of valves is a known problem. As an additional issue, previously known drying systems may be contaminated by room air during diverter valve changes. In addition, since the common instrumentation used to determine the dryness of the process air stream may require from 30 to 60 minutes to recover from the exposure to a high intermittent dewpoint, it is difficult to determine and monitor the humidity level of the process air in previously known drying systems.

SUMMARY OF THE INVENTION

In view of the above, there is a need for an improved method and a system for controlling airflow in a multiple bed desiccant drying system.

There is also a need for a method and a system which can be implemented in existing multiple bed desiccant drying systems with a minimum of components, effort, and cost.

These and other needs have been met according to the present invention as discussed in the following.

The present invention utilizes a multiple position operator for the pair of four way diverter valves which direct the process and regeneration air to the desiccant towers, in conjunction with two cutoff valves at the ambient connection ports for the regeneration air. This allows the desiccant cooling of the regenerating tower to utilize a slipstream of the dry process airflow, in order to avoid loading the regenerated bed with moist ambient air. The existing four way diverter valves are used to accomplish the diversion of the process air for the closed loop cooling of the desiccant by incorporating a multiple position actuator to seal the regeneration side of the dryer during the purge cycle, and then open slightly to allow some air to bypass through the regenerating desiccant tower for cooling. This avoids undue complication and expense.

The present invention limits the disruption of the process air dewpoint at tower change over. The present invention avoids the possibility of ambient room air contaminating the dry air circuit when open regeneration ports become connected to the dry air system while the tower diverter valves are in operation. Furthermore, by using a heat exchanger to remove some of the residual regeneration energy, the present invention avoids the use of ambient room air for desiccant cooling.

The present invention's ability to seal off the desiccant beds from the ambient atmosphere has further advantages. By sealing the desiccant beds off from the ambient atmosphere, the desiccant can be maintained in usable (i.e., dry) form for extended periods of time, for example while waiting to be moved on-line, or even when the machine is shut down. This eliminates time delays during start-up, which are required in conventional desiccant drying systems to dry out the desiccant which is exposed to the atmosphere, and reduces energy requirements.

By introducing a multi ported valve in the regeneration airflow circuit, the present invention isolates the tower system from the ambient air that would otherwise enter the drying system while the diverter valves are in intermediate or indeterminate positions during tower exchange.

The present invention also allows the use of a regeneration cooling heat exchanger with only the multi port valve as the sole additional operating device. The multi port valve may have a number of mechanical arrangements, for example both directly operated poppets, and a combination of check valves and poppet valves.

The present invention may be either incorporated into new, or retrofitted to existing, twin tower desiccant dehumidifiers. The disruptive effects of changing the tower diverter valves of a conventional twin tower desiccant dehumidifier are substantially reduced. This is accomplished through the use of a multi port valve applied to the regeneration air circuit of the dehumidifier system.

BRIEF DESCRIPTION OF THE DRAWINGS

The invention will be described in further detail hereinafter with reference to preferred embodiments illustrated in the accompanying drawings in which.

DETAILED DESCRIPTION OF PREFERRED EMBODIMENTS

Figure 1:
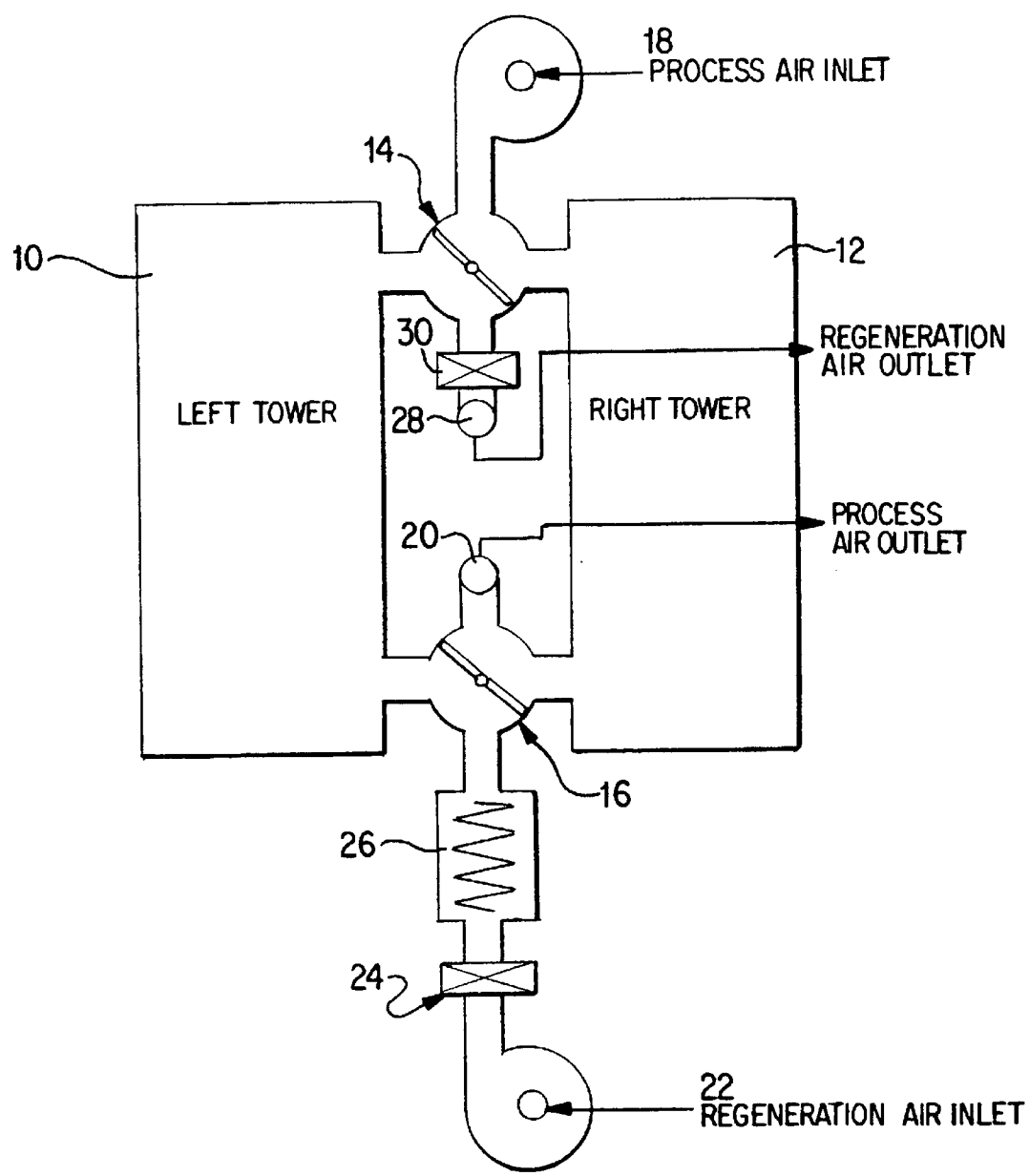
FIG. 1 shows a schematic view of a drying system according to a preferred embodiment of the present invention.

Referring to FIG. 1, a first tower 10 and a second tower 12 of a twin tower desiccant dehumidifier are schematically shown, each of which contains an adsorption medium (i.e. desiccant) for removing moisture from a process gas, for example process air used to dry plastic pellets. Each of the first and second towers 10, 12 communicate with each of first and second 4-way diverter valves 14, 16. The 4-way diverter valves 14, 16 are controllable to a plurality of positions in order to direct airflow. In the positions shown in FIG. 1, the diverter valves 14, 16 direct airflow such that the first tower 10 is in a regeneration (i.e., drying) phase, while the second tower 12 is in an adsorption phase.

A process gas inlet 18 communicates with the first 4-way diverter valve 14, which valve 14 is controllable to direct flow into either of the first tower 10 or the second tower 12. In the position shown in FIG. 1, the first valve 14 directs moist process gas, for example process air, entering the process gas inlet 18 into the second tower 12.

A process gas outlet 20 communicates with the second 4-way diverter valve 16, which valve 16 is controllable to direct flow from either of the towers 10, 12 to said outlet 20. In the position shown in FIG. 1, the second valve 16 directs dried process gas from the second tower 12 to the process gas outlet 20.

As mentioned above, in FIG. 1 the second tower 12 is shown in the adsorption phase. The process gas outlet 20 and the process gas inlet 18 are connected in a circuit with a drying vessel, not shown, for example a drying hopper containing a material to be dried such as plastic pellets. The dried process gas exits the process gas outlet 20, picks up moisture as it passes through the material to be dried in the drying vessel, and returns via the process gas inlet 18, passing through the second desiccant tower 12 to be dried again.

As mentioned above, in FIG. 1 the first tower 10 is shown in the regeneration phase. A regeneration inlet 22 communicates with the second 4-way diverter valve 16, with a first cutoff valve 24 and a heater 26 being interposed therebetween. Regeneration gas, for example ambient air, entering the regeneration gas inlet 22 is heated by the heater 26, and is directed by the second valve 16, in the position shown in FIG. 1, into the first desiccant tower 10. The heated regeneration gas picks up moisture from the moist adsorption medium in the first desiccant tower 10, and is directed via the first diverter valve 14 to a regeneration gas outlet 28, which may communicate, for example, with the ambient atmosphere or with a heat exchanger for recovery of heat energy. A second cutoff valve 30 is disposed between the first diverter valve 14 and the regeneration gas outlet 28. During the regeneration phase, both of the first and second cutoff valves 24, 30 are open to allow gas to pass therethrough.

After the adsorption medium in the first tower 10 has been de-moisturized to a desired extent, the adsorption medium needs to be cooled in order to avoid temperature disruptions when switching the first tower 10 to the adsorption phase. With regard to this regeneration cooling phase, simply turning off the heater 26 and running regeneration gas (e.g. moist ambient air) through the first tower 10 has the above-noted disadvantage of moistening the adsorption medium therein and consequently reducing the efficiency of the regeneration cycle.

In view of the above, in the present invention at least the first cutoff valve 24 is closed to prevent regeneration gas (e.g. moist ambient air) from entering the system during the cooling phase. The second 4-way diverter valve 16 is moved to an intermediate position shown in FIG. 2, in order to allow a portion of the dried process air coming from the second tower 12 to pass into the first tower 10, which portion of dried process air cools the adsorption medium in the first tower 10.

Figure 2:
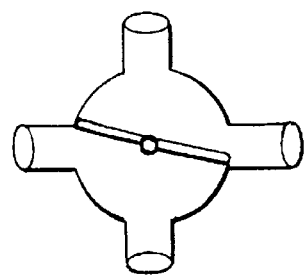
FIG. 2 shows a view of a diverter valve in an intermediate position.

In the cooling phase, the first 4-way diverter valve 14 is also moved to the intermediate position shown in FIG. 2, essentially in parallel with the movement of the second diverter valve 16. The second cutoff valve 30 is also moved to a closed position, essentially in parallel with the movement of the first cutoff valve 24. These movements of the first diverter valve 14 to the intermediate position and of the second cutoff valve 30 to the closed position are necessary in order to balance the pressures within the system.

Accordingly, during the cooling phase, both cutoff valves 24, 30 are in a closed position and both 4-way diverter valves 14, 16 are in the intermediate position shown in FIG. 2. The portion of the dried process gas which is diverted into the first tower 10 via the second diverter valve 16 picks up heat from the adsorption medium therein, and then passes via the first diverter valve 14 back into the second tower 12. The complete closure of the first tower 10 off from the regeneration gas (e.g. moist ambient air) advantageously prevents the adsorption medium contained therein from picking up moisture during the cooling phase. However, the passage of this heated process gas back into the second tower 12 results in a temperature variation in the system. In order to reduce this temperature variation, it is contemplated to install respective heat-exchangers into the system between the towers 10, 12 and the first diverter valve 14.

Alternatively, in order to reduce the above-mentioned temperature variation, it is contemplated to control the cutoff valves 24, 30 to close gradually (e.g., step-wise incrementally or continuously over a period of time) during transition from the regeneration phase to the cooling phase (i.e. after shutting off the heater 26). This gradual closing of the cutoff valves 24, 30 may be effected simultaneously with or prior to movement of the 4-way diverter valves 14, 16 from the position shown in FIG. 1 to the intermediate position shown in FIG. 2. This gradual closing of the cutoff valves 24, 30 allows an initial portion of the cooling gas (regeneration gas and/or dried process air) to pass out of the system via the regeneration gas outlet 28. While this gradual closing of the cutoff valves 24, 30 reduces temperature variations by flushing the initial portion of the cooling gas, which picks up the greatest amount of heat from the dried adsorption medium, out of the system, this advantage is a trade-off with the disadvantage of introducing some moisture into the dried adsorption medium. Those skilled in the art will understand that experimentation and testing may lead to a preferred range of times and/or positions for gradual closing of the cutoff valves 24, 30, depending upon process-specific parameters.

The cutoff valves 24, 30 allow the desiccant beds to be completely closed off from the ambient atmosphere. For example, when the machine is shut down, the cutoff valves may be closed to prevent the desiccant from picking up moisture from the ambient atmosphere. Accordingly, the present invention allows the desiccant beds to be maintained in a ready (i.e., dry) state for instant use, whereas in conventional drying systems an additional start-up time is required for drying out the desiccant which has been exposed to the ambient atmosphere, which also requires additional energy. Likewise, when the drying system is being run below design capacity (i.e., when the regenerating tower is regenerated before the adsorbing tower is fully loaded), the desiccant in the regenerated tower can be maintained in its optimum dry condition by closing the cutoff valves 24, 30 while the adsorbing tower is extended to full load before switching over.

Figure 3:
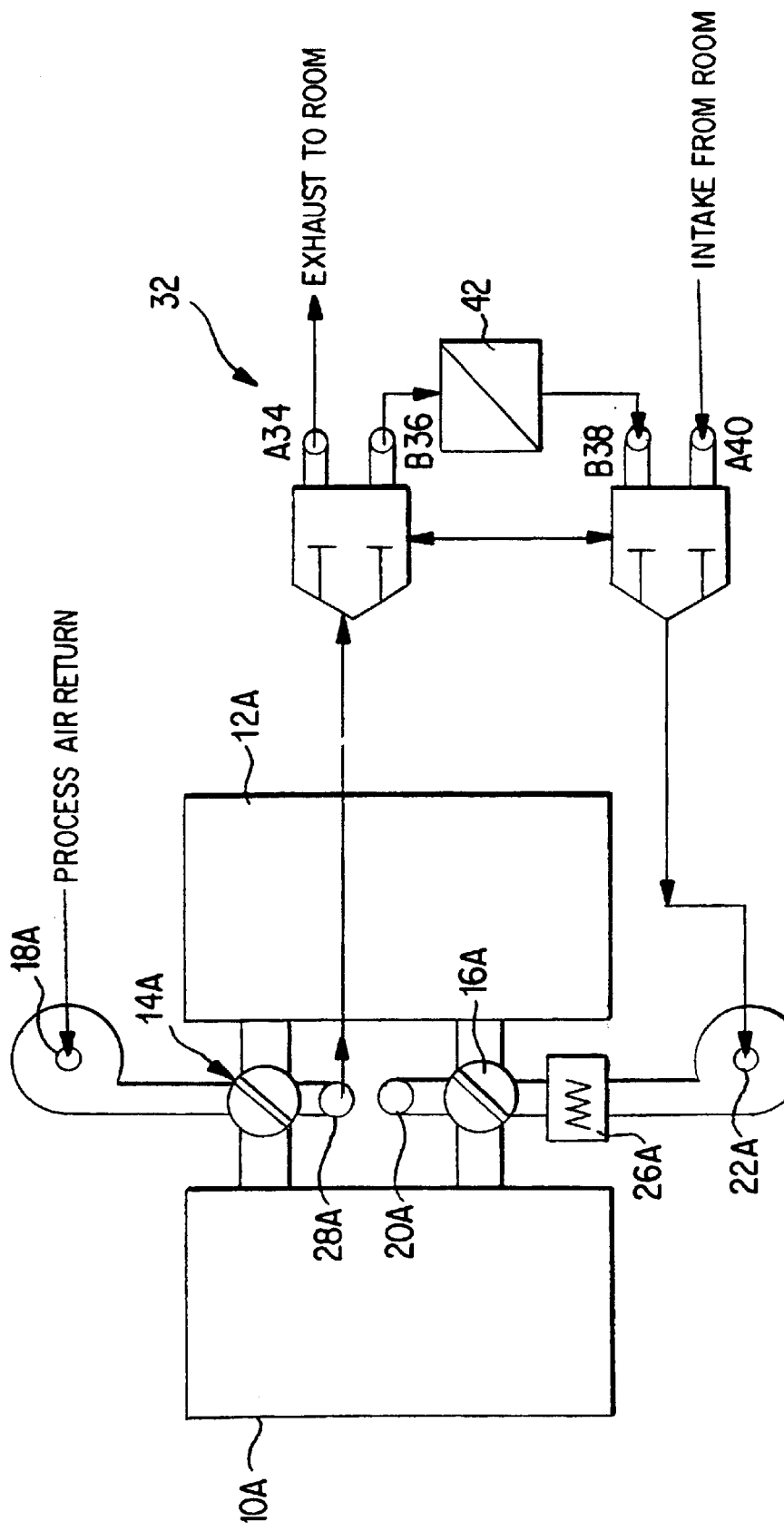
FIG. 3 shows a schematic view of a drying system according to a preferred embodiment of the present invention.

After the adsorption medium in the first tower 10 has been cooled to a desired temperature, at which time the adsorption medium in the second tower 12 may have become saturated, the first and second diverter valves 14, 16 are moved into the position shown in FIG. 3, such that the first tower 10 enters the adsorption phase and the second tower 12 enters the regeneration phase. The first and second cutoff valves 24, 30 are opened, either simultaneously with movement of the diverter valves 14, 16 into the position shown in FIG. 3, or subsequently thereto.

In FIG. 3, components which essentially correspond to the system shown in FIG. 1 are appended with an "A". In the system of FIG. 3, the regeneration gas outlet 28A and the regeneration gas inlet 22A are connected in a circuit including a regeneration valve system generally referred to as 32. The regeneration valve system 32 includes four poppet-type valves 34, 36, 38, 40. Each of the poppet-type valves is movable between an open position allowing fluid flow and a closed position blocking fluid flow, and may be constructed, for example, similar to those shown in FIG. 1 of commonly owned prior U.S. patent application Ser. No. 08/874,654 to Crawford et al.

In the system of FIG. 3, the diverter valves 14A, 16A are shown in the position in which the first tower 10A is in the adsorption phase, while the second tower 12A is in the regeneration phase. During the heating portion of the regeneration cycle, poppet valves 34 and 40 are moved to an open position, such that an open circuit is formed in communication with the ambient atmosphere via the intake port at poppet valve 40 and the exhaust port at poppet valve 34. Ambient air enters the open circuit at the intake port at poppet valve 40, subsequently passing through regeneration gas inlet 22A, heater 26A which is turned on, and second tower 12A via second diverter valve 16A, where the heated air picks up moisture from the adsorption medium. The moist air subsequently passes from the second tower 12A via first diverter valve 14A through regeneration gas outlet 28A, and returns to the ambient atmosphere via the exhaust port at valve 34.

During the subsequent cooling portion of the regeneration cycle, poppet valves 34 and 40 are closed, while poppet valves 36 and 38 are opened, such that a closed cooling circuit is formed which is shut off from the ambient atmosphere. Cooling gas in the closed cooling circuit (e.g. ambient air left in the system from the heating portion of the regeneration cycle) passes through the regeneration gas inlet 22A, the heater 26A which is turned off, and into the second tower 12A via second diverter valve 16A, where the cooling gas cools the heated dried adsorption medium. The then-heated cooling gas subsequently passes from the second tower 12A via the first diverter valve 14A through the regeneration gas outlet 28A, and to a heat exchanger 42 via a port at poppet valve 36, where the heated cooling gas is cooled. The cooled cooling gas leaves the heat exchanger and is passed back to the regeneration gas inlet 22A via a port at poppet valve 38.

Since the closed cooling circuit is shut off from the ambient atmosphere, no moisture enters the system, which would disadvantageously moisten the dried adsorption medium. Furthermore, the heat exchanger advantageously expels the heat added to the system by the heater 26A during the heating portion of the regeneration cycle. Accordingly, the system shown in FIG. 3 advantageously minimizes both humidity and thermal disruptions of the system.

The diverter valves 14A, 16A are moved from the position shown in FIG. 3 to the position shown in FIG. 1 in order to exchange the adsorption and regeneration cycles of the towers 10A, 12A. During this movement of the diverter valves 14A, 16A, all of the poppet valves 34, 36, 38, 40 are closed in order to avoid a disadvantageous introduction of moist ambient air into the system.

It is contemplated to move the diverter valves 14A, 16A gradually during the exchange between regeneration and adsorption phases, for example stepwise incrementally, e.g. into one or more intermediate positions as shown in FIG. 2, or continuously over a period of time. This gradual movement of the diverter valves 14A, 16A further helps to avoid disruptions in the quality (e.g. humidity and temperature) of the process air during the exchange between towers and phases. In the FIG. 3 embodiment, although the diverter valves 14A, 16A need not be moved into the intermediate position (as shown in FIG. 2) during the cooling phase, as a further alternative, the movement of the diverter valves 14A, 16A may be initiated during the cooling portion of the regeneration process.

Figure 4:
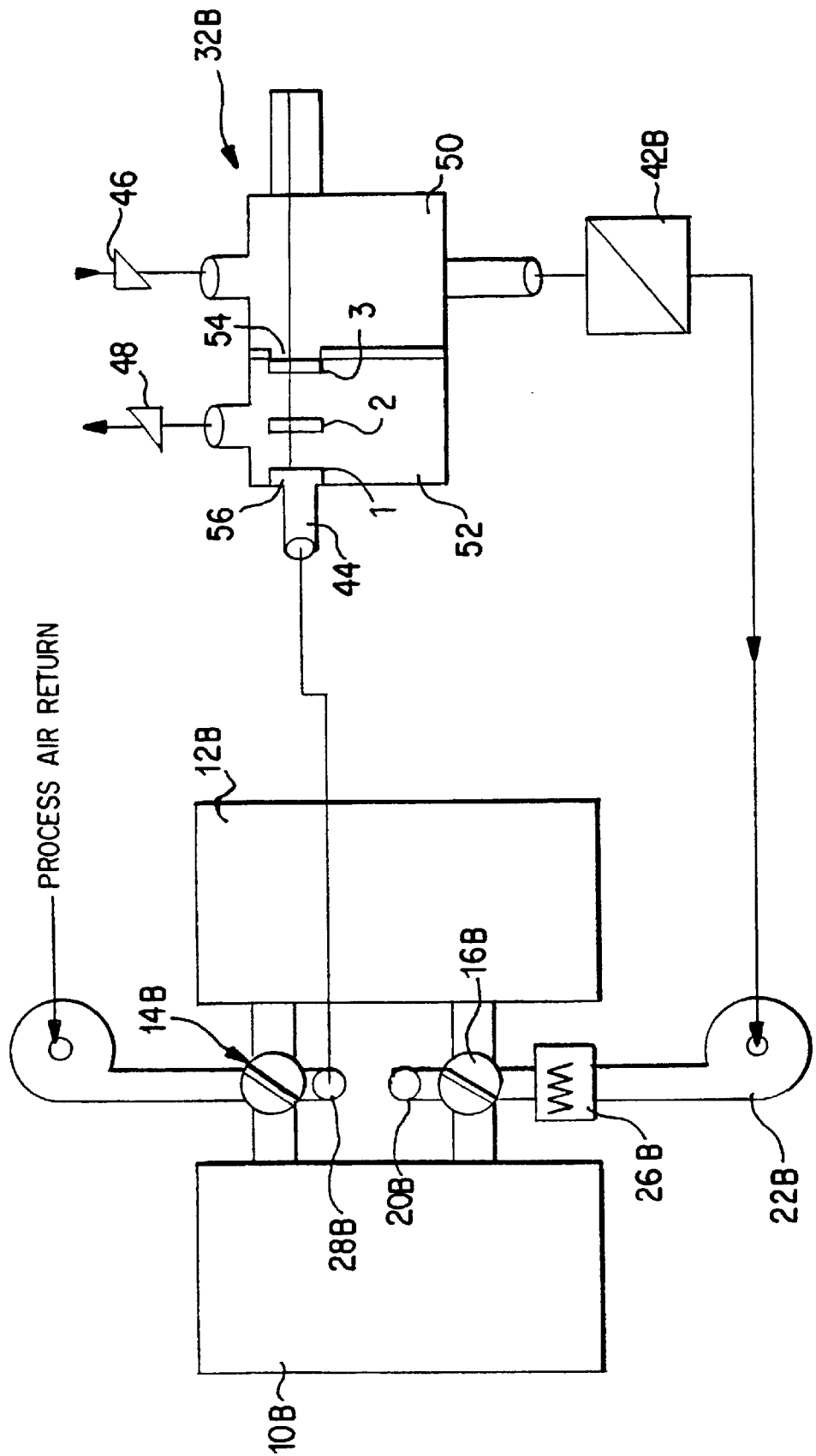
FIG. 4 shows a schematic view of a drying system according to a preferred embodiment of the present invention.

In FIG. 4, components which correspond to the system shown in FIGS. 1 and/or 3 are appended with a "B". The system of FIG. 4 operates similarly to that of FIG. 3. However, rather than using four poppet-type valves, the system of FIG. 4 utilizes a dual chamber regeneration valve system 32B with a single valve 44, and an inlet check valve 46, and an outlet check valve 48, to control regeneration airflow therethrough. The valve 44 is movable between at least three positions 1, 2, 3 as shown in FIG. 4.

During the heating portion of the regeneration cycle, the valve 44 backseats into position 3, closing port 54 and opening port 56. Inlet and outlet check valves 46 and 48 are forced open to form an open circuit in communication with the ambient atmosphere. Ambient air enters the open circuit at the inlet check valve 46, subsequently passing through chamber 50, heat exchanger 42B, regeneration gas inlet 22B, heater 26B which is turned on, and second tower 12B via second diverter valve 16B, where the heated air picks up moisture from the adsorption medium. The moist air subsequently passes from the second tower 12B via first diverter valve 14B through regeneration gas outlet 28B, and returns to the ambient atmosphere via port 56 and chamber 52.

During the subsequent cooling portion of the regeneration cycle, valve 44 is moved into intermediate position 2, and inlet and outlet check valves 46, 48 are closed, such that a closed cooling circuit is formed which is shut off from the ambient atmosphere. Cooling gas in the closed cooling circuit (e.g. ambient air left in the system from the heating portion of the regeneration cycle) passes through the regeneration gas inlet 22B, the heater 26B which is turned off, and into the second tower 12B via second diverter valve 16B, where the cooling gas cools the heated dried adsorption medium. The then-heated cooling gas subsequently passes from the second tower 12B via the first diverter valve 14B through the regeneration gas outlet 28B, into chamber 52 via port 56, into chamber 50 via port 54, and to a heat exchanger 42B, where the heated cooling gas is cooled. The cooled cooling gas leaves the heat exchanger and is passed back to the regeneration gas inlet 22B.

Since the closed cooling circuit is shut off from the ambient atmosphere, no moisture enters the system, which would disadvantageously moisten the dried adsorption medium. Furthermore, the heat exchanger advantageously expels the heat added to the system by the heater 26B during the heating portion of the regeneration cycle. Accordingly, the system shown in FIG. 4 advantageously minimizes both humidity and thermal disruptions of the system.

The diverter valves 14A, 16A are moved from the position shown in FIG. 4 to the position shown in FIG. 1 in order to exchange the adsorption and regeneration cycles of the towers 10B, 12B. During this movement of the diverter valves 14B, 16B, the valve 44 forward seats in position 1, closing port 56 and leaving port 54 open.

It is contemplated to move the diverter valves 14B, 16B gradually during the exchange, for example stepwise incrementally, e.g. into one or more intermediate positions as shown in FIG. 2, or continuously over a period of time.

Furthermore, as a further alternative, the movement of the diverter valves 14B, 16B may be initiated during a portion of the cooling portion of the regeneration process.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the knowledge of such persons and equivalents thereof.

What is claimed is:

1. A method for controlling airflow in a desiccant drying system having two desiccant beds,
    a first diverter valve communicating with each of said desiccant beds, a regeneration air inlet, and a process air outlet, and
    a second diverter valve communicating with each of said desiccant beds, a process air inlet, and a regeneration air outlet, said method comprising the acts of:
    (a) regenerating a first of said beds by moving said first diverter valve to a position in which said first bed communicates with said regeneration air inlet and a second of said beds communicates with said process air outlet, and moving said second diverter valve to a position in which said first bed communicates with said regeneration air outlet and said second bed communicates with said process air inlet;
    (b) subsequently cooling said first bed by moving said first diverter valve to an intermediate cooling position in which said second bed communicates with both of said process air outlet and said first bed, and closing said regeneration air inlet.

2. A method according to claim 1, further comprising the acts of:
    (c) regenerating said second bed by moving said first diverter valve to a position in which said second bed communicates with said regeneration air inlet and said first bed communicates with said process air outlet, and moving said second diverter valve to a position in which said second bed communicates with said regeneration air outlet and said first bed communicates with said process air inlet; and
    (d) subsequently cooling said second bed by moving said first diverter valve to an intermediate cooling position in which said first bed communicates with both of said process air outlet and said second bed, and closing said regeneration air inlet.

3. A method according to claim 1, wherein act (b) further comprises moving said second diverter valve to an intermediate cooling position in which said second bed communicates with both of said process air inlet and said first bed.

4. A method according to claim 3, wherein act (b) further comprises closing said regeneration air outlet.

5. A method for controlling airflow in a desiccant drying system having two desiccant beds,
    a first diverter valve communicating with each of said desiccant beds, a regeneration air inlet, and a process air outlet, and
    a second diverter valve communicating with each of said desiccant beds, a process air inlet, and a regeneration air outlet, said method comprising the acts of:
    (a) regenerating a first of said beds by moving said first diverter valve to a position in which said first bed communicates with said regeneration air inlet and a second of said beds communicates with said process air outlet, and moving said second diverter valve to a position in which said first bed communicates with said regeneration air outlet and said second bed communicates with said process air inlet, each of said regeneration air outlet and said regeneration air inlet being communicated with the ambient atmosphere;
    (b) subsequently cooling said first bed by communicating said regeneration air outlet and said regeneration air inlet with each other in a closed circuit including a heat exchanger.

6. A method according to claim 5, further comprising the acts of:
    (c) regenerating said second bed by moving said first diverter valve to a position in which said second bed communicates with said regeneration air inlet and said first bed communicates with said process air outlet, and moving said second diverter valve to a position in which said second bed communicates with said regeneration air outlet and said first bed communicates with said process air inlet, each of said regeneration air outlet and said regeneration air inlet being communicated with the ambient atmosphere; and
    (d) subsequently cooling said second bed by communicating said regeneration air outlet and said regeneration air inlet with each other in said closed circuit including said heat exchanger.

7. A desiccant drying system, comprising:
    two desiccant beds;
    a first diverter valve communicating with each of said desiccant beds, a regeneration air inlet, and a process air outlet;
    a second diverter valve communicating with each of said desiccant beds, a process air inlet, and a regeneration air outlet;
    each of said first and second diverter valves being movable between a first bed regeneration position, at least one intermediate cooling position, and a second bed regeneration position,
    wherein in said first bed regeneration position, said first diverter valve communicates a first of said beds with said regeneration air inlet and communicates a second of said beds with said process air outlet, and said second diverter valve communicates said first bed with said regeneration air outlet and communicates said second bed with said process air inlet;

wherein in said intermediate cooling position, said first diverter valve communicates said second bed with both of said process air outlet and said first bed, and said second diverter valve communicates said second bed with both of said process air inlet and said first bed; and wherein in said second bed regeneration position, said first diverter valve communicates said second bed with said regeneration air inlet and communicates said first bed with said process air outlet, and said second diverter valve communicates said second bed with said regeneration air outlet and communicates said first bed with said process air inlet.

8. A system according to claim 7, further comprising a first cutoff valve controllable to close said regeneration air inlet when said first diverter valve is in said intermediate cooling position, and a second cutoff valve controllable to close said regeneration air outlet when said second diverter valve is in said intermediate cooling position.

9. A system according to claim 7, further comprising a heat exchanger arranged between each of said first and second beds and said second diverter valve.

10. A desiccant drying system, comprising:

two desiccant beds;

a first diverter valve communicating with each of said desiccant beds, a regeneration air inlet, and a process air outlet;

a second diverter valve communicating with each of said desiccant beds, a process air inlet, and a regeneration air outlet;

each of said first and second diverter valves being movable between a first bed regeneration position, and a second bed regeneration position, wherein in said first bed regeneration position, said first diverter valve communicates a first of said beds with said regeneration air inlet and communicates a second of said beds with said process air outlet, and said second diverter valve communicates said first bed with said regeneration air outlet and communicates said second bed with said process air inlet;

wherein in said second bed regeneration position, said first diverter valve communicates said second bed with said regeneration air inlet and communicates said first bed with said process air outlet, and said second diverter valve communicates said second bed with said regeneration air outlet and communicates said first bed with said process air inlet;

a heat exchanger; and a valve system operable to selectively communicate said regeneration air inlet and said regeneration air outlet with one of (a) the ambient atmosphere, and (b) each other in a closed circuit with said heat exchanger.

11. A system according to claim 10, further comprising means for controlling said valve system to communicate said regeneration air inlet and said regeneration air outlet with the ambient atmosphere during a regeneration phase, and (b) means for controlling said valve system to communicate said regeneration air inlet and said regeneration air outlet with each other in a closed circuit with said heat exchanger during a cooling phase.

12. A system according to claim 10, wherein said valve system comprises a first and a second dual poppet valve, said first dual poppet valve being communicated with said regeneration air outlet and including a first poppet valve selectively communicable with the ambient atmosphere and a second poppet valve selectively communicable with said heat exchanger, said second dual poppet valve being communicated with said regeneration air inlet and including a first poppet valve selectively communicable with said heat exchanger and a second poppet valve selectively communicable with the ambient atmosphere.

13. A system according to claim 10, wherein said valve system is a dual chamber regeneration valve comprising:

a first chamber communicable with said regeneration air outlet and communicable with the ambient atmosphere via an outlet check valve;

a second chamber communicable with said first chamber, communicable with the ambient atmosphere via an inlet check valve, and communicating with said regeneration air inlet via said heat exchanger; and a single valve selectively movable between a regeneration position shutting off communication between said first and second chambers, a diverter valve movement position shutting off communication between said first chamber and said regeneration air outlet, and an intermediate cooling position between said regeneration position and said diverter valve movement position.

* * * * *